United States Patent [19]

Hayashi et al.

[11] Patent Number: 4,519,469
[45] Date of Patent: May 28, 1985

[54] METHOD AND APPARATUS FOR AUTOMATIC CONTROL OF DRIVING SPEED

[75] Inventors: Kunihisa Hayashi; Takahiro Nogami, both of Toyota, Japan

[73] Assignee: Toyota Jidosha Kabushiki Kaisha, Toyota, Japan

[21] Appl. No.: 415,436

[22] Filed: Sep. 7, 1982

[30] Foreign Application Priority Data

Sep. 7, 1981 [JP] Japan .............................. 56-140705

[51] Int. Cl.³ .............................................. B60T 7/12
[52] U.S. Cl. .................................. 180/169; 180/170; 340/903; 343/7 VM
[58] Field of Search .................... 180/169, 143, 170; 340/53, 62, 903; 343/7 VM

[56] References Cited

U.S. PATENT DOCUMENTS

| | | | |
|---|---|---|---|
| 3,011,580 | 12/1961 | Reid | 180/169 |
| 3,172,496 | 3/1965 | Rabinow et al. | 180/169 |
| 3,921,749 | 11/1975 | Kawada | 180/169 |
| 4,079,802 | 3/1978 | Kawata | 180/169 |

FOREIGN PATENT DOCUMENTS 58531  4/1982  Japan .................................. 180/169

Primary Examiner—Richard A. Bertsch
Assistant Examiner—Michael Mar
Attorney, Agent, or Firm—Kenyon & Kenyon

[57] ABSTRACT

A system for automatically controlling driving speed includes a fixed speed driving device for keeping the driving speed at a predetermined speed and a control device for maintaining an optimum interval between the vehicle and the vehicle driving ahead. A hold circuit for holding the optimum driving speed, based on the distance from the vehicle driving ahead, is actuated by a circuit for detecting curves in the road, whereby the hold circuit maintains the driving speed of the vehicle as it rounds a curve at the optimum driving speed determined for the vehicle before it entered the curve.

4 Claims, 3 Drawing Figures

METHOD AND APPARATUS FOR AUTOMATIC CONTROL OF DRIVING SPEED

BACKGROUND OF THE INVENTION

1. Field of the Invention

This invention relates to an automatic driving speed control system and method for a motor vehicle, more particularly to a method and apparatus by which an optionally determined fixed vehicle speed can be maintained automatically and which automatically controls the distance from a motor vehicle driving ahead.

2. Description of the Prior Art

Fixed speed driving devices are used to control the speed of a motor vehicle into which such a device has been fitted. When the speed of a motor vehicle is at a certain desired rate, the fixed speed driving device automatically controls the speed to hold it constant at that rate, without need for the driver to touch the accelerator. This reduces driver fatigue, especially when driving continuously at a fixed speed on highways.

Fixed speed driving, however requires braking when the motor vehicle driving ahead slows down. Braking releases the automatic fixed speed driving control, and after each braking action it is necessary to reset the device. This makes practical, proper function of the fixed speed driving device difficult in heavy traffic.

Improved fixed speed driving devices are known in the prior art and are described, for example, in Japanese Public Disclosure No. 52(1977)-110388, which relates to a fixed speed driving device further provided with a vehicle interval control device which automatically controls the speed of the motor vehicle to a constant speed when the vehicle interval is great and controls the vehicle speed to maintain the optimum vehicle interval when the interval is short. This device automatically adjusts the speed of the vehicle such that the driver almost never needs to control the driving speed thus giving much improved heavy-traffic operation.

The above-mentioned improved prior art device, however, leaves one particular, practical problem unsolved. Ordinary fixed speed driving systems use Doppler radars or the like to detect the distance between the device-fitted vehicle and the vehicle ahead. Thus when a curve or bend in the road is encountered, the Doppler beam loses the motor vehicle in front as it enters the curve. It therefore appears to the device that the distance between the motor vehicles has increased greatly, and the device then accelerates the vehicle to the preset speed. This may require the operator to override the control system due to the decreasing real distance between the vehicles.

SUMMARY OF THE INVENTION

Accordingly, the general object of the present invention is to provide an apparatus for automatic control of driving speed of a motor vehicle, the apparatus comprising: A fixed speed control device for keeping the driving speed of the motor vehicle at a predetermined speed and a control device for maintaining optimum interval between the controlled vehicle and another vehicle ahead, wherein the improvement comprises a hold circuit for holding the controlled vehicle at the optimum driving speed, based on the interval between the controlled vehicle and the other vehicle ahead, and a curve detecting circuit for detecting curves in the road, wherein the hold circuit is actuated when a curve in the road is detected to keep the vehicle at the speed obtained before the curve was detected.

A further object of the present invention is to provide a method for automatically controlling driving speed comprising: processing an optimum driving speed on the basis of both a predetermined fixed speed and a calculated driving speed for maintaining the distance from a motor vehicle driving ahead at the safest value; detecting a state indicative of the vehicle driving on a curve in the road; and holding the driving speed of the vehicle at the optimum driving speed processed before the vehicle entered the curve during the time that the vehicle drives on the curve.

BRIEF DESCRIPTION OF THE DRAWINGS

The above mentioned features, and the objects of the present invention will become more apparent from the following description made with reference to the accompany drawings in which.

DESCRIPTION OF THE PREFERRED EMBODIMENT

Figure 1:
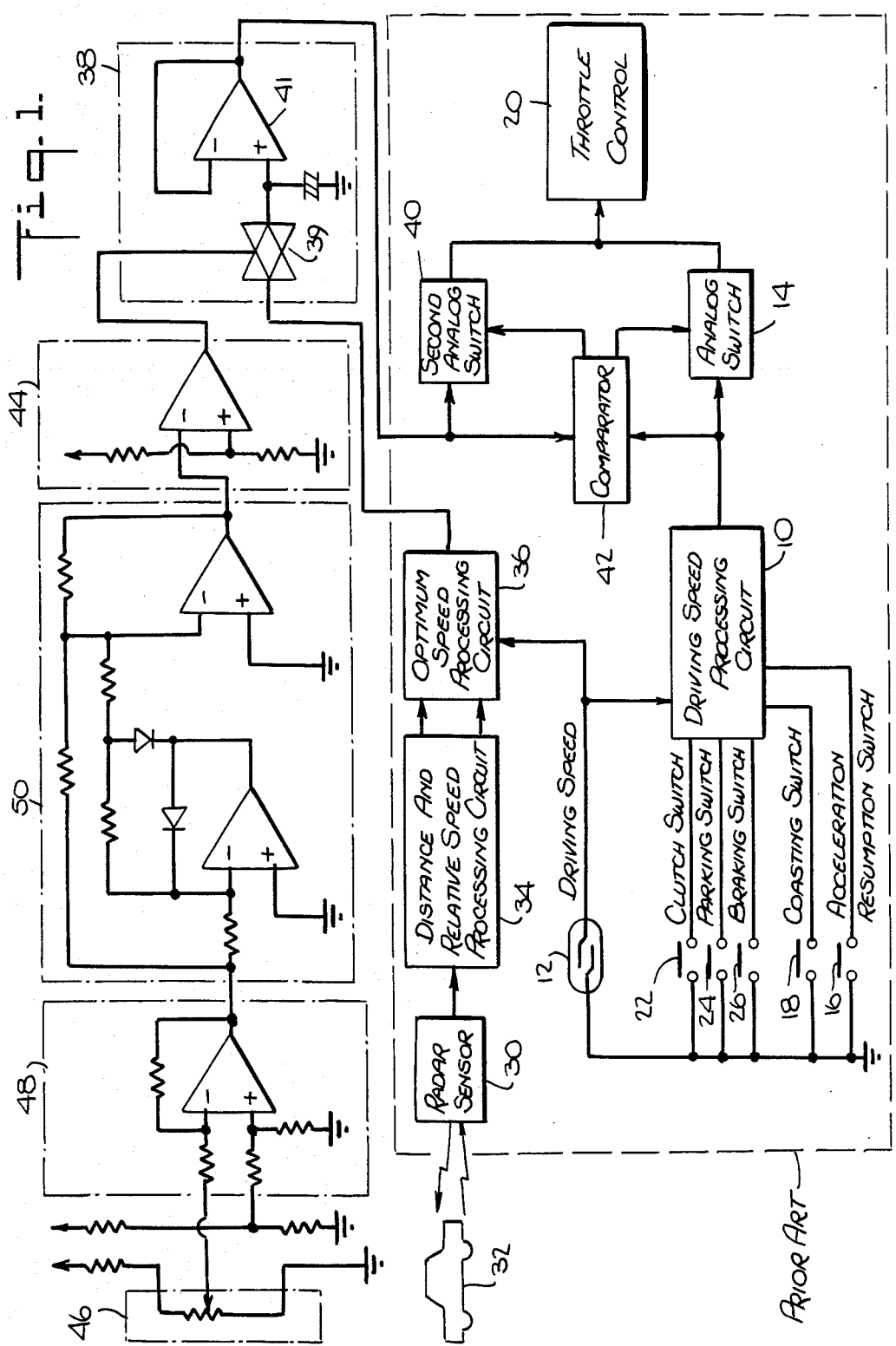
FIG. 1 is a diagram showing a preferred embodiment of an automatic fixed speed driving system in accordance with the present invention.

FIG. 1 includes a block diagram of an embodiment of a prior art automatic fixed speed driving system suitable for use with the improvement of the present invention. The system has a fixed speed driving device which determines a fixed driving speed and a control device capable of optimizing the interval between the controlled vehicle and another vehicle driving ahead by controlling the speed of the controlled vehicle relative to that of the other vehicle driving ahead.

The fixed speed driving device includes a driving speed processing circuit 10 which receives electric signals indicative of the actual driving speed based on pulse signals supplied by a reed switch 12, actuated by a magnet attached to a rotary member of the vehicle, and outputs to an analog switch 14 the constant driving speed selected by the operator. In this device, the operator selects the desired driving speed by operating an acceleration resumption switch 16 or a coast switch 18. The acceleration resumption switch 16 increases the driving speed during the time that it is being pressed, and the actual speed of the vehicle at the time it is released then becomes the fixed driving speed. This driving speed is then supplied to a throttle cotrol 20 in the form of an analog signal. The automatic fixed speed driving action then starts to operate.

The coasting switch 18 serves to decrease the fixed driving speed. While the coast switch is pressed the vehicle coasts under its own momentum, and its speed falls progressively. Upon release of the switch 18 the speed at which the vehicle is travelling at the time then becomes the new fixed driving speed, so that fixed speed driving continues, but at the new, lower, set speed.

The fixed speed driving device is released when the clutch switch 22, the parking switch 24, or the braking switch 26 is closed; thus fixed speed driving can be performed easily and safely.

The control device for optimizing the distance from the motor vehicle driving ahead includes a radar sensor 30 which transmits and receives a Doppler beam to and from another vehicle 32 driving ahead, the beam having a desired degree of directionality. The echo reflected from the other vehicle 32 is received by a radar sensor 30. On the basis of this echo, a distance and relative speed processing circuit 34 calculates the distance from and the speed relative to the other vehicle driving ahead. The distance and the relative speed signals are supplied to an optimum speed processing circuit 36. These signals are compared with the actual speed signal obtained through the reed switch 12 and an optimum (safest) driving speed signal is calculated. This driving speed signal is supplied to a second analog switch 40 (by way of a hold circuit 38 in the present invention), and the optimum driving speed signal is then supplied to the throttle control circuit 20 by way of the analog switch 40 in the same way as explained in the case of the fixed speed driving.

A comparator 42 is provided in order to compare the set driving speed signal obtained from the fixed speed driving device and the optimum driving speed signal obtained from the control device for optimizing the distance from the motor vehicle driving ahead. The two signals are compared, and the lower signal is selected. The selected lower driving speed signal is supplied to the throttle control circuit 20 from either the analog switch 14 or 40. Consequently, when the distance from the motor vehicle driving ahead is great enough, fixed speed driving is performed, and when the vehicle comes closer to the vehicle ahead, the interval between the two vehicles is controlled to assure safe driving. Therefore, according to the embodiment illustrated in FIG. 1, the control device of the prior art makes it possible to determine the optimum driving speed on the basis of both the relative driving speed and the distance from the motor vehicle driving ahead, thus greatly improving the device's convenience for the driver.

It is a feature of the present invention that, as mentioned above, the optimum driving speed signal from the control device for optimizing the distance from the motor vehicle driving ahead is supplied to the analog switch 40 by way of a hold circuit 38, which includes a switching element 39 connected to one input of an operational amplifier 41. Under normal circumstances, the hold circuit 38 passes on the optimum driving speed signal obtained from the optimum driving speed processing circuit 36, but it can, if necessary, temporarily hold unchanged the optimum driving speed signal.

The present invention is also characterized in that a curve detecting circuit 44 is provided to put the hold circuit 38 in the hold state when the vehicle rounds a curve in the road. The curve detecting circuit 44 in this embodiment is composed of a comparator and detects the presence of a curve in the road from the steering angle which is detected by a steering angle sensor 46 comprising a potentiometer coupled to the steering mechanism. The signal representing the detected result is supplied to an absolute value circuit 50 by way of a differential amplifier 48, so that deflection from straight-course driving is outputted as an absolute value regardless of whether the steering direction is to the right or to the left. The curve detecting circuit 44, therefore, detects a curve in the road by comparing the deflection value delivered to one input of the comparator with a standard value delivered to the other input.

Accordingly, in the present invention, when the motor vehicle enters a curve in the road, a hold signal from the curve detecting circuit 44 is supplied to the switching element 39 (such as a C-MOS IC) of the hold circuit 38, and the hold circuit 38 holds and stores the optimum driving speed signal at that time. In other words, the optimum driving speed signal representing the optimum speed relating to the other motor vehicle 32 driving ahead (i.e., the optimum driving speed signal at the time that the vehicle ahead is still within the range of the Doppler radar beam) is held in the hold circuit 38, and this signal is forwarded to the analog switch 40.

Figure 2:
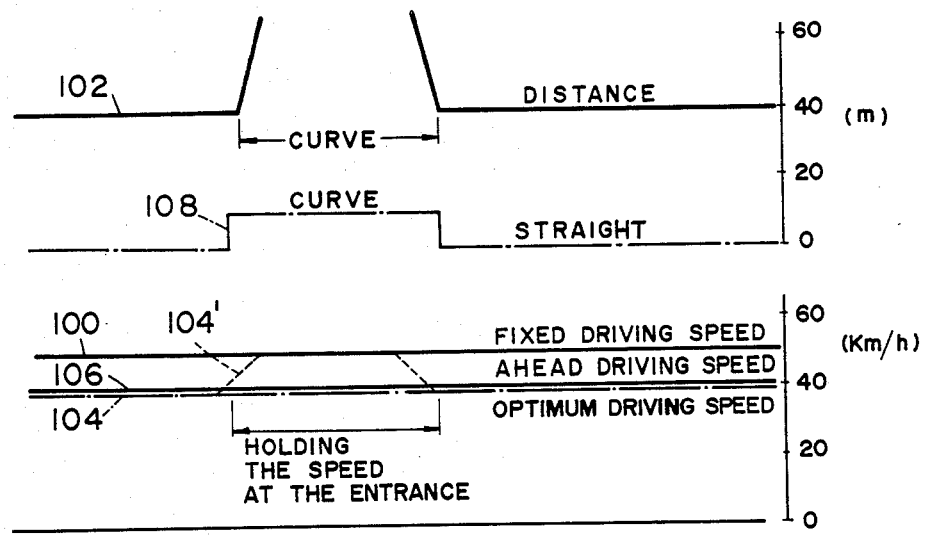
FIGS. 2 and 3 are illustrations for explaining the operation of the present invention.

FIG. 2 shows a graphical illustration of the operation of the improved system of the present invention.

The optimum speed 104, calculated from the distance to and relative speed of the motor vehicle driving ahead, is shown as being lower than the driving speed 100 set for fixed speed driving. Consequently, the comparator 42 in FIG. 1 selects the optimum driving speed 104 and supplies this to the throttle control circuit 20. In such a driving-speed controlled state, the optimum driving speed 104 usually coincides with the driving speed 106 of the motor vehicle ahead.

Figure 3:
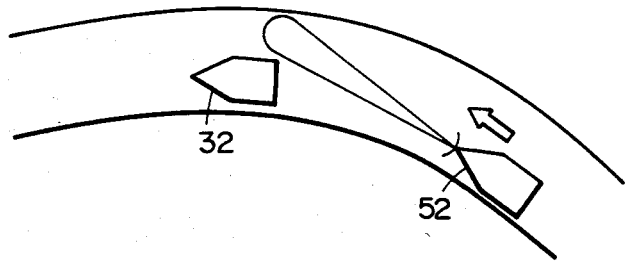

In such controlled state, however, when the controlled vehicle 52 enters into a curve in the road, as shown in FIG. 3, the Doppler beam loses the motor vehicle 32 driving ahead, and it is then impossible to calculate the optimum driving speed signal. Furthermore, it is possible that the beam may echo off a railing at the side of the road or that an error signal may be produced by some other cause. Such an error signal, as shown by the break in the radar distance signal 102, may be interpreted as showing that there is sufficient distance ahead. As a result, in the prior art system the driving speed may be suddenly accelerated to the preset fixed driving speed, as shown by dotted line 104' in FIG. 2.

According to the present invention, upon entrance by the controlled vehicle into a curve in the road, the curve detecting circuit 44 outputs a hold signal 108, and the optimum driving speed is held at the driving speed at the time of entrance into the curve. Therefore, the sudden acceleration mentioned above can be prevented.

In the present embodiment, detecting of a curve in the road is performed by detecting the steering angle, and it is therefore possible to detect any curve in any road. In the embodiment described above, the control of the distance from the motor vehicle driving ahead takes the relative driving speed into consideration. The present invention can, however, also be applied in such a manner that only the distance from the motor vehicle ahead is taken into consideration.

As described heretofore, the present invention ensures safe driving at curves in the road using an automatic fixed speed driving control system which combines fixed speed driving and control of the distance from the motor vehicle driving ahead.

In the present invention, each electronic processes can be performed also by the use of a properly programmed computer.

What we claim is:

1. In a device for automatically controlling a driving speed of a first motor vehicle, the device including means for setting a desired fixed driving speed signal for the first vehicle, means for detecting a distance to a second vehicle driving ahead of the first vehicle and for generating a corresponding distance signal, means for generating an optimum driving speed signal in response to the distance signal for maintaining an optimum interval between the first and second vehicles, means for comparing the optimum and desired driving speed signals, and means for controlling the driving speed of the first vehicle in response to the lower of said compared signals, the improvement comprising:

means for detecting a deviation from straight course driving of the first vehicle;

means for generating a deviation signal corresponding to a detected deviation from straight course driving; and a hold circuit connected between the means for generating the optimum driving speed signal and the means for comparing the optimum and desired driving speed signals, said hold circuit being responsive to said deviation signal for holding the value of the optimum driving speed signal delivered to the comparing means constant for the duration of the deviation signal at a value obtained at the beginning of the deviation signal.

2. In a device according to claim 1, the means for detecting a deviation from straight course driving of the first vehicle comprising a steering angle sensor for generating a signal corresponding to steering angle; and the means for generating a deviation signal comprising means for generating a signal corresponding to zero steering angle deflection and a comparator for comparing said steering angle signal with said zero steering angle deflection signal and for delivering a difference signal to said hold circuit.

3. A method for automatically controlling the driving speed of a first motor vehicle, the method including providing a selected desired fixed driving speed signal for the first vehicle, detecting a distance to a second vehicle driving ahead of the first vehicle, generating a corresponding distance signal, calculating an optimum driving speed signal for the first vehicle in response to the distance signal, comparing the desired and optimum driving speed signals, and controlling the driving speed of the first vehicle in accordance with the lesser of the compared signals, wherein the improvement comprises:

sensing a deviation from straight course driving of the first vehicle;

generating a signal in response to a sensed deviation from straight course driving of the first vehicle; and holding the optimum driving speed signal constant for the duration of said deviation signal at a value obtained at the beginning of the deviation signal.

4. A method according to claim 3 wherein the step of sensing a deviation from straight course driving comprises sensing a deviation of steering angle of the first vehicle from a straight course steering angle.

* * * * *